United States Patent Office 3,417,087
Patented Dec. 17, 1968

3,417,087
3(AMINOPROPIONYL)BENZOTHIOPHENES
Ernest E. Campaigne, Bloomington, Ind., and Edward S. Neiss, Willingboro, N.J., assignors to Research Corporation, New York, N.Y., a non-profit corporation of New York
No Drawing. Filed Dec. 27, 1965, Ser. No. 516,703
2 Claims. (Cl. 260—247.1)

ABSTRACT OF THE DISCLOSURE

Novel Mannich compounds of the formula

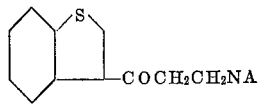

wherein A forms with the nitrogen atom an organic ring system, have been prepared. Such compounds exhibit antimicrobial activity.

---

This invention relates to novel antimicrobial agents and compositions.

The work on which this application was based was financed in whole or in part by the U.S. Public Health Service.

We have found that Mannich bases obtained by the reaction of 3-acethylbenzo[b]thiophene with organic nitrogen bases and formaldehyde exhibit substantial antimicrobial activity particularly in the form of their water-soluble acid addition salts. The organic bases may include secondary alkyl- and aralkylamines, such as dimethyl-, diethyl- and dibenzylamine, and secondary heterocyclic nitrogen bases such as morpholine, pyrrolidine, piperidine, hexamethyleneimine and 3-azabicyclo[3,2,2]nonane.

The Mannich base from morpholine, 3-(β-N-morpholinopropionyl)benzo[b]thiophene (1):

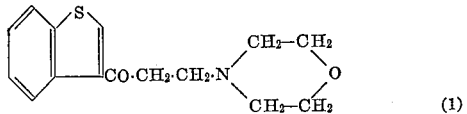

is of particular interest having a high antimicrobial activity against a wide range of organisms including gram-positive and gram-negative bacteria and fungal cells.

The method of making the compounds of the invention will be illustrated by the following example of the production of the morpholino compound.

To a 50-ml. flask containing 25 ml. of absolute ethanol is added 4.35 g. (0.05 mole) of morpholine and the pH is adjusted to 3–4 with concentrated HCl. To this is added 8.8 g. (0.05 mole) of 3-acetylbenzo[b]thiophene [M. W. Farrar and R. Levine, J. Am. Chem. Soc. 72, 4433 (1950)] and 2.3 g. of paraformaldehyde. The reaction mixture is refluxed for 4 hours and is then poured into 100 ml. of dry acetone. After cooling in the refrigerator overnight the white precipitate is collected and recrystallized from absolute ethanol.

The following table gives the melting points, yields and minimum inhibitory concentration (MIC) for three microorganisms for hydrochlorides of typical Mannich bases prepared by the described method.

TABLE I

| Amine | M.P., °C. | Purified yield, percent | MIC (1) | MIC (2) | MIC (3) |
|---|---|---|---|---|---|
| Dimethyl | 173–174 | 65 | 10–33 | >100 | >100 |
| Diethyl | 136–137 | 53 | 10–33 | >100 | >100 |
| Dibenzyl | 213–214 | 44 | >100 | >100 | >100 |
| Pyrrolidine | 198–199 | 67 | 33–100 | 33–100 | >100 |
| Piperidine | 228–229 | 71 | 33–100 | >100 | >100 |
| Morpholine | 205–206 | 57 | 3.3–10 | 10–33 | 10–33 |
| Hexamethyleneimine | 194–195 | 70 | 10–33 | 33–100 | 10–33 |
| 3-azabicyclo-[3,2,2] nonane | 189–190 | 54 | 10–33 | >100 | 10–33 |

(1) *Staphylococcus aureus.*
(2) *Escherichia coli.*
(3) *Saccharomyces cerevisiae.*

The test microorganisms consisted of stock laboratory strains of *Staphylococcus aureus, Escherichia coli,* and *Saccharomyces cerevisiae*. The minimal inhibitory concentration (MIC) of each compound for the test organisms was determined by the agar method. Appropriate concentrations of each compound were incorporated in 15-ml. portions of liquified nutrient agar, the medium was then poured into Petri plates, and 0.05 ml. of 24-hr. nutrient broth cultures of the microbial species were spread on the solidified agar surfaces. For the yeast species, glucose yeast infusion agar and broth, instead of nutrient agar and broth, were employed. The lower concentrations of Mannich bases that prevented the development of visible growth are listed in Table I.

We claim:
1. Mannich bases of the formula:

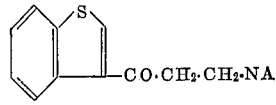

wherein A forms with the nitrogen atom pyrrolidine, piperidine, morpholine, hexamethyleneimine and 3-azabicyclo-3,2,2 nonane.

2. 3-(β-N-morpholinopropionyl)benzo[b] thiophene.

References Cited

UNITED STATES PATENTS

| 1,915,334 | 6/1933 | Salzberg et al. | 260—243 |
| 2,075,359 | 3/1937 | Salzberg et al. | 167—22 |
| 3,326,935 | 6/1967 | Kaiser et al. | 260—330.5 |

NICHOLAS S. RIZZO, *Primary Examiner.*

JOSE TOVAR, *Assistant Examiner.*

U.S. Cl. X.R.

260—293.4, 330.5, 326.5; 167—33